United States Patent [19]

Salpietro

[11] Patent Number: 5,193,240
[45] Date of Patent: Mar. 16, 1993

[54] MOULD AND METHOD FOR PRODUCING SHOE SOLES OF INJECTED PLASTICS MATERIAL, COMPRISING AN EMPTY CHAMBER VISIBLE THROUGH A TRANSPARENT MATERIAL

[75] Inventor: Francesco Salpietro, Padova, Italy
[73] Assignee: Protec s.r.l., Padova, Italy
[21] Appl. No.: 822,997
[22] Filed: Jan. 21, 1992

[30] Foreign Application Priority Data

Aug. 6, 1991 [IT] Italy ............... MI91A 002214

[51] Int. Cl.⁵ ..................... A43D 65/00; A43D 65/02
[52] U.S. Cl. ..................... 12/146 B; 12/142 RS; 12/142 T; 264/244; 425/119
[58] Field of Search ........... 12/146 B, 142 RS, 142 T; 264/244, 254, 255; 425/119

[56] References Cited

U.S. PATENT DOCUMENTS

| | | | |
|---|---|---|---|
| 3,474,496 | 10/1969 | Wernerklee | 264/255 |
| 4,072,461 | 2/1978 | Pirk | 425/119 |
| 4,562,606 | 1/1986 | Folschweiler | 12/142 RS |
| 5,112,560 | 5/1992 | Moumdjian | 264/244 |

*Primary Examiner*—Paul T. Sewell
*Assistant Examiner*—M. D. Patterson

*Attorney, Agent, or Firm*—Notaro & Michalos

[57] ABSTRACT

Process for producing shoe soles of injected plastics material, which soles have an empty chamber visible through a transparent material, which process comprises the following steps:
  a) injection, into a hollow region comprised between a mobile die and a first removable plate, of a multipart tread sole, with at least one of said sole parts being made from a transparent material;
  b) injection, into a region comprised between said first removable matrix and a second, removable matrix, of a shaped body comprising a perimetrical wall 13 and a top wall 14;
  c) removal of said first matrix and injection, into the hollow region comprised between said tread sole and said shaped body, of a layer 17 made of a material suitable for bonding the shoe sole and said shaped body to each other;
  d) removal of said second matrix and injection, into the hollow region comprised between the vamp, the tread sole and the external side of said shaped body, of a material which constitutes the intersole;
  e) possible either partial or total filling of the empty chamber comprised between the tread sole and said shaped body, with a coloured liquid material.

3 Claims, 3 Drawing Sheets

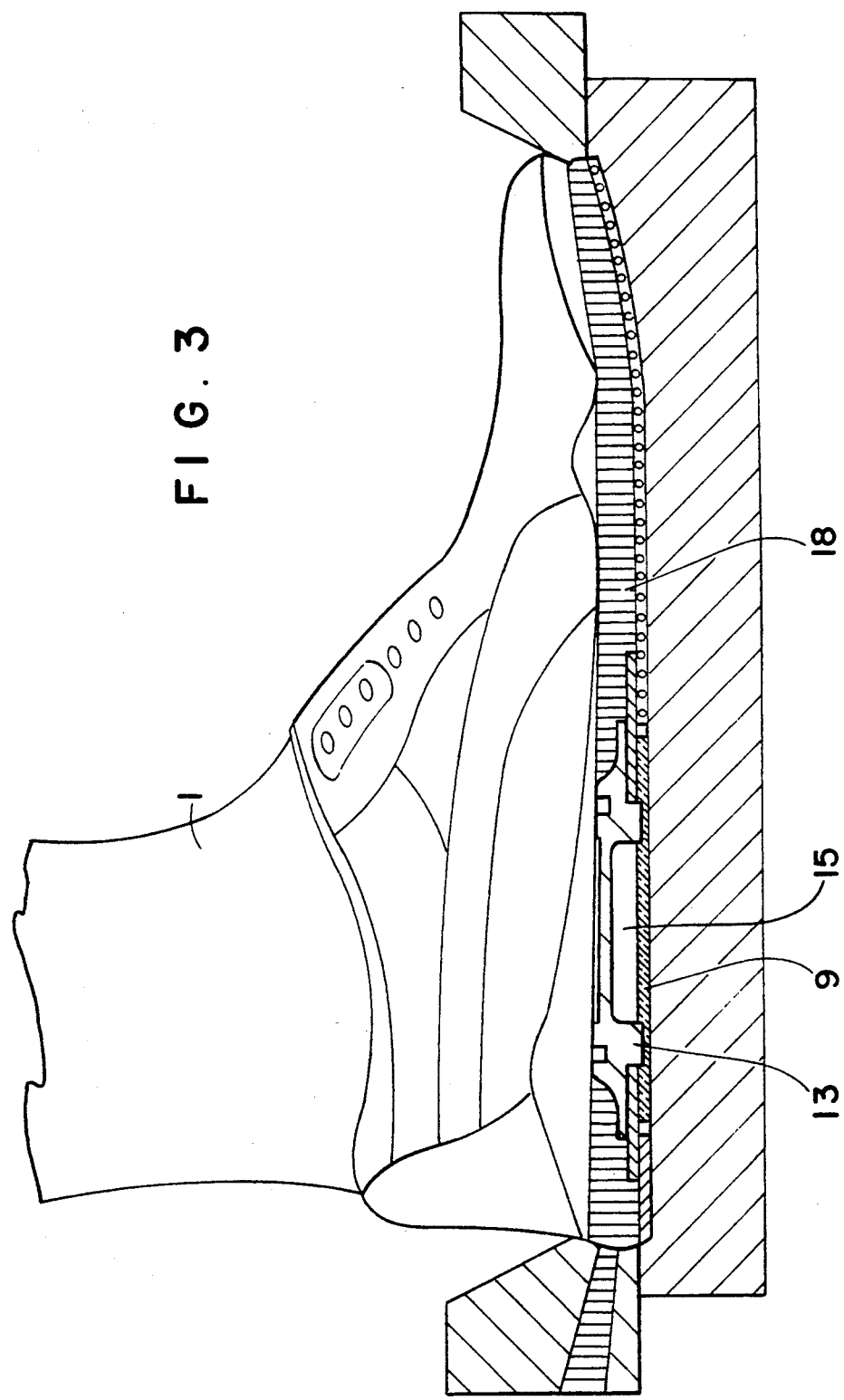

MOULD AND METHOD FOR PRODUCING SHOE SOLES OF INJECTED PLASTICS MATERIAL, COMPRISING AN EMPTY CHAMBER VISIBLE THROUGH A TRANSPARENT MATERIAL

The present invention proposes a mould and a method for producing shoe soles of injected plastics material, which shoe soles comprise an empty chamber visible through a transparent material.

In particular, by the method according to the present invention, a shoe sole of four or more colours can be produced, in which a portion of the tread layer is made from a transparent material, and which contains an inner empty chamber, visible from the outside through a transparent portion of said tread sole.

Such an empty chamber can be filled with a material, such as a coloured liquid, in order to attain novel aesthetical effects.

Apparatuses for manufacturing soles of two or more colours are known, which apparatuses comprise a last on which the vamp is placed; a mould, or movable die with the contour of the tread, a pair of sealing rings to laterally close the mould and one or more intermediate plates, so contoured as to make it possible intermediate sole layers to be produced, still by injection.

These machines are used in order to produce shoe soles which are constituted by two or three layers of materials of different colours, or having different characteristics. For example, the tread may be made from a material endowed with a high mechanical strength, and the intersole may be made from a flexible, soft material.

Oftentimes, these moulds are installed on a carrousel which, by revolving, causes them to sequentially reach several injectors which inject the molten material into the mould.

Also machines are known, in which at least two sole layers can be injected simultaneously, e.g., the one of said layers into the upper side, and the other layer in correspondance of the lower portion of an intermediate plate inserted between the last and the die.

When this injection is complete, the plate is removed, the die is approached to the vamp, and an intersole layer is injected which bonds both previous layers to each other.

The market, in particular in apparel sector, is always looking for novel solutions, and within this context the present invention proposes now a mould and a method for producing four-colour shoe soles having a transparent portion in their tread, which allows an empty chamber provided in correspondence of this portion, to be seen into.

Said empty chamber can be partially filled, e.g., with a coloured filling liquid, with novel, unforeseeable aesthetical effects.

These, and still other purposes, are achieved by means of an apparatus according to the characterizing portion of the appended claims.

The present invention is disclosed now in detail, for merely exemplifying, non-limitative purposes, with reference to the accompanying drawing, in which:

FIG. 3 shows the sectional view of the mould during the shoe sole completion step.

Figure 1:
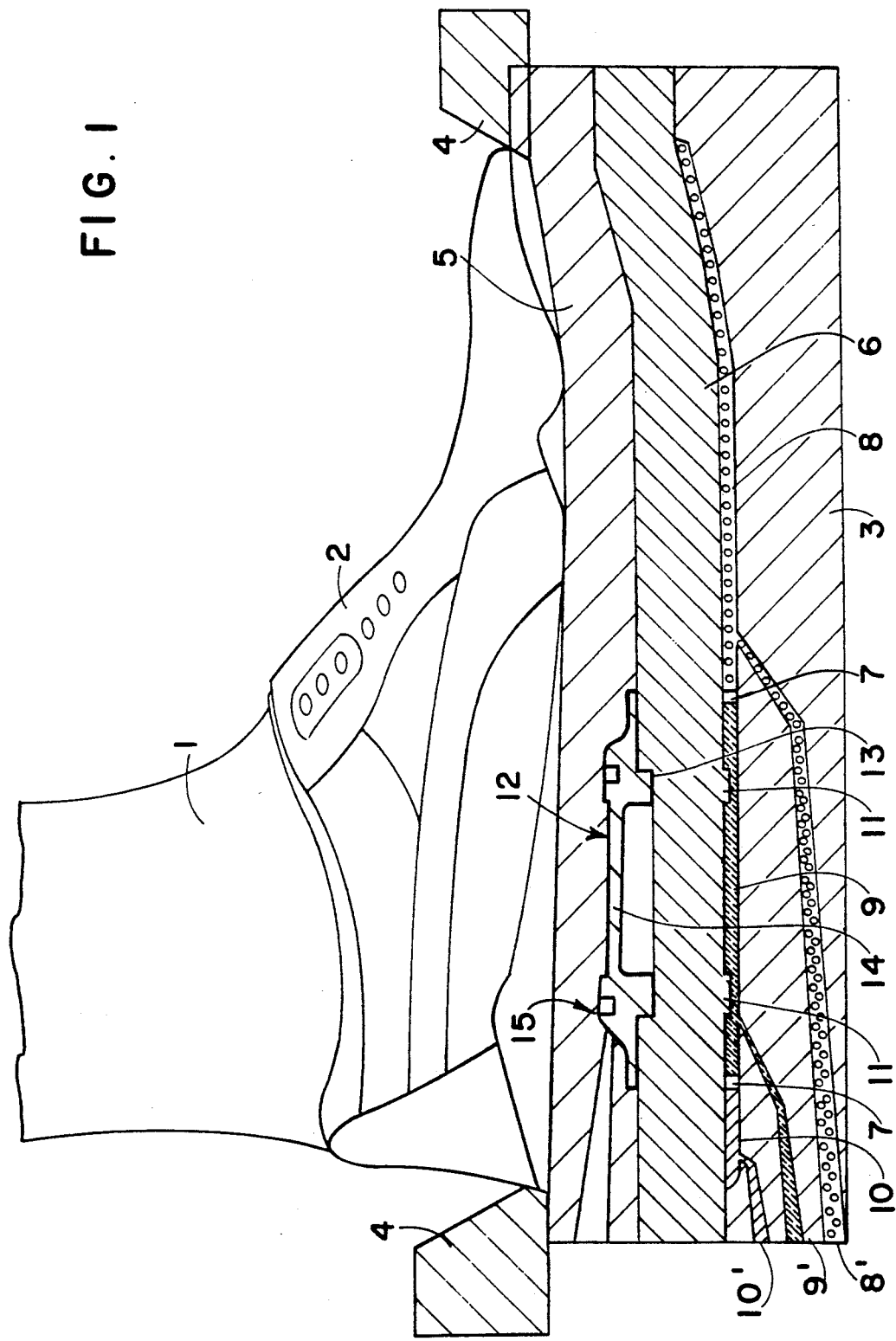
FIG. 1 shows a sectional view of a mould according to the invention, during the first step of shoe sole injection.

The mould according to the invention comprises a last 1 on which a vamp 2 is fitted, and a bottom die 3, installed in a known way on such devices as, e.g., a hydraulic piston, which drive said bottom die to move in vertical direction in order to approach it towards, and move it away from, the last 1.

At its sides, the mould is closed by a pair of contoured half-rings 4, and two intermediate, removable plates 5 and 6 are provided.

These removable plates are installed on supports capable of inserting them between the last 1 and the die 3, and of removing them too.

The devices which drive the movements of the plates are already known and, due to this reason, they are not discussed herein in detail.

The process according to the invention is disclosed now, and the innovative features of the mould are illustrated during the course of the disclosure.

During the first step the plates 5 and 6, overlapped to each other, are placed between the last 1 and the die 3.

The die 3 is then brought into contact with the bottom plate, and the region around the vamp is closed by means of the rings 4.

In the die 3 the pattern is provided of the tread which is subdivided into three distinct regions, 8, 9 and 10, by a pair of partitioning walls 7 and 8. Said three regions 8, 9, 10 of the tread are fed with injection materials by three respective injection channels, indicated with the reference numerals 8', 9', 10'.

On its lower side, the plate 6 is provided with a relieved rim 11, e.g., with a closed polygonal or curvilinear outline, the function of which will become clearer later on, during the course of the disclosure.

With the mould being in this position, three injections are carried out either sequentially or simultaneously, into the regions 8, 9 and 10, using, e.g., different-coloured materials; in particular, in region 9 an injection with a transparent material is carried out.

An injection is carried out simultaneously into the region comprised between the plates 5 and 6, which are so shaped as to define a shaped body indicated with the reference numeral 12, which has a closed side wall 13 and a top wall 14.

The wall 13 is provided, at its bottom, with an edge with shape and dimensions corresponding to those of the relieved rim provided on the lower side of plate 6.

In its top portion, the wall 13 is so shaped as to define two edges 15 protruding upwards, slightly spaced apart from each other.

When the first injection step is complete, the mould is opened, the bottom plate 6 is removed, the mould is closed again, and the die 3 is moved upwards, with the tread sole being brought into contact with the upper plate 5.

Consequently, the lower edge of the wall 13 enters the groove which the relieved rim 11 generated in the transparent portion 9 of the shoe sole.

Figure 2:
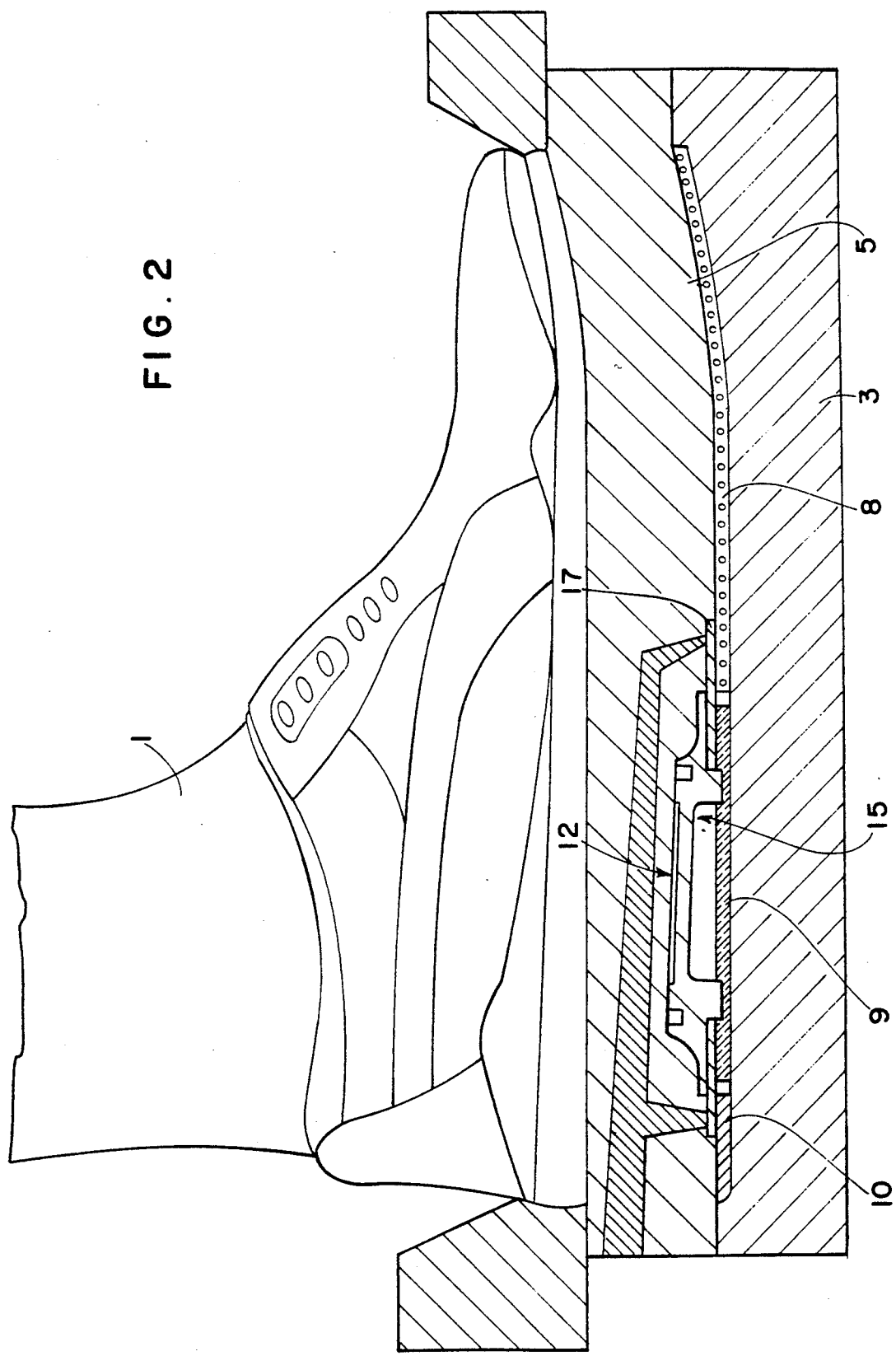
FIG. 2 shows a sectional view of the same mould, during the intermediate manufacturing step.

In that way, between the sole portion 9 and the shaped body 12, an empty chamber is defined, which is indicated with the reference numeral 15 in FIG. 2.

The length of the lower edge of the wall 13 is longer than the depth of the groove generated by the relieved rim 11 in the region 9 of shoe sole, so that, when the die 3 is brought into contact with the plate 5, a thin gap remains empty between the shaped body 12 and the tread sole.

This thin gap is filled during the second injection step (FIG. 2), with the material 17, which anchors the tread sole and the shaped body 12 to each other.

The mould is opened once more, the plate 5 is removed, and the die 3, to which the tread sole and the shaped body 12 remained adherent, is brought to rest against the upper last 1 and the vamp 2.

This situation is illustrated in FIG. 3.

During the latter step, the material 18 destined to constitute the intersole, and which will definitely anchor the tread sole to the vamp, is injected.

The edge 15, protruding upwards from the shaped body 12 is pressed against the vamp, thus preventing the intersole material from penetrating between the last 12 and the vamp, with the risk of said material penetrating, or even completely filling, the underlying empty space, being thereby prevented.

The footwear is thus complete, and the empty chamber 15 can be now partially filled, e.g., with a coloured liquid, which will remain visible through the transparent portion 9 of the sole tread.

The liquid can now be filled into the hollow chamber 15 in a known way, e.g., it can be injected by means of an injection needle.

In that way, a footwear with a shoe sole of four or more colours can be obtained, which contains a hollow chamber closed by a transparent wall, and partially filled with a coloured material, the movement of which can be seen through the tread sole.

In particular, also the shaped body 12 can be made from a transparent material, thus enabling the colour to be seen also through the side wall of the shoe sole.

Many modifications and alternative forms of practical embodiment will be clear to those skilled in the art, all of which shall have to be understood as falling within the purview of the present invention.

I claim:

1. Process for producing shoe soles of injected plastics material, which soles have an empty chamber visible through a transparent material, which process comprises the following steps:
    a) injection, into a region comprised between a mobile die and a first, removable plate, of a multipart tread sole, with at least one of said sole parts being made from a transparent material;
    b) injection, into a region comprised between said first removable plate and a second, removable plate, of a shaped body comprising a perimetrical wall 13 and a top wall 14;
    c) removal of said first plate and injection into the region comprised between said tread sole and said shaped body, of a layer 17 made from a material suitable for bonding the shoe sole and said shaped body to each other;
    d) removal of said second plate and injection, into the region comprised between the vamp, the tread sole and the external side of said shaped body, of a material which constitutes the intersole;
    e) either partial or total filling of the empty chamber comprised between the tread sole and said shaped body, with a coloured liquid material.

2. Process according to claim 1, characterized in that the injections of (a) and (b) steps are carried out simultaneously.

3. Mould for producing shoe soles of injected plastics material comprising a hollow chamber visible through a transparent material, characterized in that said mould comprises:

a last 1 destined to receive the shoe vamp, which is fitted on it;

a die 3 with the pattern of the tread sole, installed on a mobile support suitable for causing said die to be urged against said last 1;

a first plate suitable for defining, in the region comprised between it and said die, a space for the injection of the tread sole, with said first plate being provided on its lower side, with a relieved rim 11 with closed contour;

a second intermediate plate 5 suitable for being brought to rest against said first plate 6, with said plates 5 and 6 being so shaped as to define, between them, a shaped body 12 with a downwards protruding edge, said edge corresponding, as for shape and size, with the relieved element 11 in the lower face of the plate 6;

means suitable for placing said plates between said last and said die, and for removing them from that position.

* * * * *